United States Patent [19]

Schmidt et al.

[11] Patent Number: 5,746,788
[45] Date of Patent: May 5, 1998

[54] PROCESS FOR THE SIMULTANEOUS SORPTION OF WATER AND ORGANIC COMPOUNDS

[75] Inventors: Torsten Schmidt; Michael Hoffmeister, both of Hanover, Germany

[73] Assignee: Engelhard Process Chemicals GmbH, Iselin, N.J.

[21] Appl. No.: 633,752

[22] PCT Filed: Nov. 11, 1994

[86] PCT No.: PCT/EP94/03729

§ 371 Date: Apr. 24, 1996

§ 102(e) Date: Apr. 24, 1996

[87] PCT Pub. No.: WO95/13857

PCT Pub. Date: May 26, 1995

[30] Foreign Application Priority Data

Nov. 19, 1993 [DE] Germany .................. 43 39 500.7

[51] Int. Cl.⁶ .................................................. B01D 53/02
[52] U.S. Cl. .................. 48/198.2; 48/198.3; 95/117; 95/143
[58] Field of Search .................. 48/127.3, 198.2, 48/198.3; 95/117, 123, 124, 98, 143

[56] References Cited

U.S. PATENT DOCUMENTS

| | | | |
|---|---|---|---|
| 4,521,221 | 6/1985 | Rihter et al. | 48/127.3 |
| 4,726,818 | 2/1988 | Keung et al. | 95/124 |
| 4,784,672 | 11/1988 | Sircar | 95/123 |
| 5,110,328 | 5/1992 | Yokota et al. | 55/180 |
| 5,421,860 | 6/1995 | Bretz et al. | 55/143 |

FOREIGN PATENT DOCUMENTS

| | | |
|---|---|---|
| 46141 | 2/1982 | European Pat. Off. . |
| 343697 | 11/1989 | European Pat. Off. . |
| 369171 | 5/1990 | European Pat. Off. . |
| 570847 | 11/1993 | European Pat. Off. . |
| 3412173 | 10/1985 | Germany . |
| 3743681 | 5/1989 | Germany . |

*Primary Examiner*—Christopher Upton

[57] ABSTRACT

Described is a process for the simultaneous sorption of water and organic compounds from gases selected from the group comprising natural gas and process gases (e.g. waste gases of maleic acid or terephthalic acid (anhydride) production or phthalic acid anhydride production or of steam reforming). The gas to be treated is contacted with a sorbent comprising particulate activated carbon in an oxidic carrier on a basis of silicon dioxide, aluminum oxide, aluminum phosphate or aluminosilicate. When natural gas is treated, water and C5+ hydrocarbons, for example, can be separated simultaneously. In steam reforming, with appropriate process management, C2+ hydrocarbons, $CO_2$ and water can be absorbed simultaneously.

16 Claims, 4 Drawing Sheets

PROCESS FOR THE SIMULTANEOUS SORPTION OF WATER AND ORGANIC COMPOUNDS

BACKGROUND OF THE INVENTION

The present invention relates to a process for the sorption of water and organic compounds from gases selected from the group comprising natural gas and process gases by using a sorbent comprising activated carbon in an oxidic carrier.

German patent application ... (P 42 16 867.8= European patent application filing number 93 10 7797.9) describes sorbents comprising activated carbon in an oxidic carrier. It is pointed out that a great number of organic substances can be separated from gases with the aid of this sorbent, for instance aliphatic or aromatic hydrocarbons; it is also possible to absorb solvents as are found in the outlet air of paint shops or printing shops. As can be learnt from an example, a small amount of water can absorbed from test gas mixtures consisting of nitrogen, toluene and water, apart from the predominant amount of toluene.

There are very different reasons why water, $CO_2$ and organic compounds are separated from natural gas or process gases. For instance, it may be desirable to separate water and organic compounds from waste gases so that the cleaned waste gases can be discharged into the environment. It may also be desirable to separate water and specific organic components from gases whenever said components are undesired or objectionable when the gases in question are used in a technical process. Apart from methane, natural gas, for instance, contains a complex mixture of higher hydrocarbons and some water.

The constitutional characteristics of such gas mixtures upon variation of the pressure, the volume and/or the temperature differ from the known characteristics of single-component systems. The so-called "retrograde" characteristics of such gas mixtures are due to the fact that boiling curve and dew-point curve cover a constitutional field in which saturated phases also exist above the critical point. A condensation of components of the gas mixture can also be observed upon a decrease in pressure or an increase in temperature because of the curve of that field. This phase region extends into the region of the temperatures and pressures observed during gas transportation (i.e. for example in natural gas pipelines) the further the higher the amount of higher hydrocarbons is. Furthermore, natural gas must be dried to avoid obstacles presented by ice or hydrates of hydrocarbons to pipeline transportation. So far amorphous aluminosilicate beads with the aid of which higher hydrocarbons (C5+) are separated in processes employing changing temperatures have been used for separating water and higher hydrocarbons from natural gas.

Hydrogen flows resulting from refining processes or steam reforming processes are normally contaminated with hydrocarbons and/or carbon dioxide. These impurities have so far been separated by means of activated carbon in processes employing changing pressures.

The simultaneous separation of water and organic compounds, in particular C5+ hydrocarbons, i.e. hydrocarbons which contain at least 5 hydrocarbon atoms, has so far been carried out with sorbents based on silicon dioxide. Water and C5+ hydrocarbon compounds have been separated from natural gas and waste gases resulting from the production of maleic acid anhydride, terephthalic acid anhydride or phthalic acid anhydride. C2+ carbon compounds have been separated from waste gases resulting from steam reforming.

EP-A-0369171 and EP-A-0343697 describe each a sorbent comprising particulate activated carbon and aluminum oxide which can be used for the sorption of water and organic compounds from gases.

SUMMARY OF THE INVENTION

It is the object of the present invention to provide an improved process for the simultaneous sorption of water and organic compounds from gases selected from the group comprising natural gas and process gases.

This object is achieved according to the invention with a process for the simultaneous sorption of water and organic compounds from gases selected from the group comprising natural gas and process gases, wherein the gas is contacted with a sorbent comprising particulate activated carbon in an oxidic carrier, characterized in that the carrier has been made from a gel, with the proviso that the process does not comprise the sorption of toluene and water by contacting a gas consisting of nitrogen, toluene and water with a sorbent containing 6.4% by wt. or 20% by wt. of activated carbon in silicon dioxide for 3 seconds.

In the process of the invention for the simultaneous sorption of water and organic compounds from gases selected from the group comprising natural gas and process gases, the gas to be treated is contacted with a sorbent comprising particulate activated carbon in an oxidic carrier, preferably based on silicon dioxide, aluminum oxide, aluminum phosphate or aluminosilicate. Of course, the oxidic carrier may also comprise mixtures, in particular of said oxides. The process known from German patent application ... (P 42 16 867.8), which is used for the sorption of toluene and water by contacting the test gas consisting of nitrogen, toluene and water with a sorbent containing 6.4% by wt. or 20% by wt. of activated carbon in $SiO_2$ for 3 seconds, is exempted from the scope of the present invention.

The term "natural gas" comprises all natural gases which predominantly contain methane and may be pretreated, if desired, e.g. "sweetened".

The term "process gases" in its widest sense covers any desired gases that contain water and organic compounds in gaseous or vaporous form. One may optionally determine by simply contacting a gas and through a subsequent analysis whether a specific organic substance can be absorbed. It is possible to remove polar and non-polar, hydrophilic and hydrophobic organic substances which are present in gaseous or vaporous form. For instance, it is possible to absorb substances which are only composed of carbon and hydrogen, e.g. aliphatic or cycloaliphatic hydrocarbons, such as gasoline, or aromatic hydrocarbons, such as benzene, toluene or xylene. It is also possible to absorb compound classes which contain carbon and heteroatoms, such as nitrogen, oxygen, halogen atoms, sulfur, phosphorus and optionally hydrogen. For instance, it is possible to remove $CO_2$, halogenated carbons, halogenated hydrocarbons, such as chlorinated carbons, chlorinated hydrocarbons, chlorofluorocarbons, hydrogen chlorofluorocarbons, fluorocarbons, hydrogen fluorocarbons, alcohols, ketones, carboxylic acid esters, aldehydes, aliphatic, cycloaliphatic or aromatic ethers, alkyl phosphorus compounds, alkyl sulfur compounds. As follows from the above, it can be assumed that, with the exception of methane, any desired organic substance can be absorbed.

Apart from water, preferred process gases contain vaporizable aliphatic hydrocarbon compounds having one or more carbon atoms, aromatic hydrocarbons, such as benzene or toluene, hydrogen and/or $CO_2$. Especially preferred process gases are derived from the production of maleic acid or terephthalic acid anhydride, from the production of phthalic acid or from steam reforming.

Within the scope of the present invention, the term "activated carbon" includes activated-carbon black, activated-carbon coke and graphite, but no activated-carbon molecular sieve.

The particle size of the activated carbon is expediently in the range of from 50 to 50,000 nm, preferably in the range of from 50 to 10,000 nm.

The content of activated carbon in the sorbent can vary within a wide range, for instance between 0.1 and 90% by wt., based on the total weight of the sorbent. The content is preferably between 0.5 and 70% by wt., in particular between 5 and 40% by wt., and between 5 and 30% by wt. in an especially preferred manner.

Sorbents coated with activated carbon can be used; a uniform distribution of the activated carbon in the sorbent is especially advantageous.

Amorphous and/or crystalline material can be used as the oxidic carrier. Amorphous oxidic carriers which may contain crystalline material are very well suited. Amorphous oxidic carriers based on silicon dioxide or aluminosilicate are especially well suited for use in the process of the invention.

Crystalline components, such as zeolite or aluminum phosphate, may be contained in an amount of up to 50% by weight, based on the total weight of the sorbent.

The sorbent can be present in any desired form, for instance as a granular material, extrudate or monolith. Particles having a size of at least 0.1 mm, especially beaded particles, are expedient. The diameter of the beaded particles is advantageously in the range of from 0.5 to 10 mm, preferably in the range of from 1 to 6 mm.

The production of the usable sorbent is described in the said prior German patent application . . . (P 42 16 867.8). The production of oxidic materials based on amorphous or crystalline silicon dioxide, aluminum oxide, aluminum phosphate or aluminosilicate is known. Crystalline aluminosilicate, for instance, can be produced by analogy with the process of DE-AS 1 038 015. Sodium aluminate solution and sodium silicate solution are here intermixed to form a gel and are made crystalline. Depending on the molar ratio of silicon and aluminum, different zeolites can be produced. The sorbent can be made by mixing and solidifying zeolite, binder and activated carbon, e.g. by way of granulation.

The production of amorphous aluminosilicates can take place by analogy with the process described in DE-OS 29 17 313. An aluminate solution and a silicate solution are combined and immediately put into a precipitation oil. Bead-like bodies of amorphous aluminosilicate are formed. Activated carbon is added by precipitation by adding activated carbon to either the aluminate solution or the silicate solution or to both solutions.

An alternative possibility is that an (acid) aluminum sulfate solution and a silicate solution are combined with one another and converted into amorphous aluminosilicate. In this case, too, activated carbon can be added to one or both solutions. Beaded bodies that contain activated carbon are again obtained when the blended solutions are immediately put into a precipitation oil.

A sorbent which contains activated carbon and is based on amorphous silicon dioxide is obtained by mixing a silicate solution containing activated carbon into an acid solution. Alternatively, activated carbon could also be added to the acid solution. Beaded bodies are again obtained upon dropwise introduction into a precipitation oil.

In addition to the activated carbon, crystalline components, such as zeolites, may be admixed.

Spray gelation may also be used as a method for producing sorbents containing activated carbon. A sol containing activated carbon is sprayed into a reactive gas. The spray jet tears open, thereby forming drops, and spherical particles are formed that solidify in the reaction gas and form a gel. For instance, a metastable acid aluminum oxide sol can have added thereto activated carbon and can be sprayed into ammonia gas.

Alternatively, solidified amorphous oxidic materials can be coated with activated carbon, for instance, by spraying with an activated-carbon suspension in water.

Other conventional steps, such as ageing, base exchange, washing, deionizing, drying or tempering, can subsequently be taken. Especially advantageous sorbents are obtained when the precipitated oxidic material is dried after ageing, but prior to base exchange.

The use of a sorbent containing activated carbon for the simultaneous sorption of water and organic compounds from gases shall now be explained.

In one embodiment, water and higher-boiling hydrocarbons, preferably C5+ hydrocarbons, are simultaneously separated from the gas to be treated. On the one hand, it is possible to clean the gas with such a treatment; on the other hand, water or the above-mentioned higher-boiling hydrocarbons are prevented from condensing upon possible decreases in temperature and/or increases in pressure of the gas. Hence, the dew point of the gas is lowered relative to water and said hydrocarbons. The sorbent which contains activated carbon and the gas or the sorbent and a gas stream to be treated are contacted for at least 20 minutes for the simultaneous separation of water and C5+ hydrocarbons. The treatment can generally be carried out at a reduced pressure, at ambient pressure or at an increased pressure. Contact is preferably established at pressures of from 1 to 150 bar (abs.). For instance, process gases, especially process gases of the maleic acid or terephthalic acid anhydride synthesis or the phthalic acid synthesis, can be treated in this manner.

Natural gas can also be treated at said pressures. The operating conditions for the simultaneous separation of water and C5+ hydrocarbons are preferably above 30 bar, especially in case of pipeline pressure, i.e. at pressures of 80 to 110 bar (abs.).

The sorption of water and the said higher-boiling hydrocarbons is expediently performed at a temperature in the range of from 0° to 50° C. (changing temperature regeneration), and desorption at a temperature of from 150° to 350° C. Desorption can be carried out with heated gases, for instance air or inert gases, such as nitrogen. The water contained in the regeneration gas and the higher-boiling hydrocarbons can be condensed by cooling the regeneration gas and can then be separated. One proceeds preferably in such a manner that a split stream of the gas to be treated is used as the regeneration gas, the split stream being heated to a temperature of from 150° to 300° C. and passed through the charged sorbent, and the regeneration gas being charged with the desorbate, and that the desorbate-charged regeneration gas is freed from the desorbate under cooling in that the desorbate is condensed, and the desorbate-freed regeneration gas is added to the gas (or gas stream) which is to be treated or has been treated.

In the above-described embodiment, it is of course possible to treat gases, such as natural gases, which contain hydrocarbons having less than 5 carbon atoms. These lower-boiling hydrocarbons are not absorbed or only absorbed to a negligent degree.

Another embodiment of the invention permits the simultaneous separation of water, $CO_2$ and/or C2+ hydrocarbons. To this end, the gas to be treated, especially natural gas or steam reforming gas, is contacted with the sorbent, which contains the activated carbon, for a relatively short period of time, especially for not more than 15 minutes. $CO_2$ or the low-boiling hydrocarbons are then more and more replaced by higher-boiling substances. The temperature during sorption is preferably in the range of from 0° to 50° C.; the desorption temperature in the range of from 0° to 50° C. Desorption is expediently effected in that the temperature of the sorbent is kept constant, but the pressure is lowered (changing pressure regeneration).

In this process variant, it is of course possible to treat gases which have higher-boiling hydrocarbons, such as C5+ hydrocarbon compounds. These hydrocarbon compounds are only negligently or not at all absorbed during the above-described short treatment in which water and C2+ carbon compounds are absorbed up to compounds having 4 carbon atoms.

This variant is especially preferred in the treatment of waste gases of a steam reforming process. In steam reforming, crude oil and water are passed over a catalyst, whereby hydrocarbon products are formed that are rich in aromatic compounds and isoparaffin. The waste gases from the said process contain hydrogen, water, carbon dioxide and, inter alia, ethane. When these waste gases are contacted with the sorbent containing activated carbon at the said temperature and at the said pressure for not more than about 15 minutes, water, the C2+ carbon compounds up to compounds having 4 carbon atoms, and carbon dioxide are absorbed by the sorbent. Methane and hydrogen do not absorb.

The separated hydrocarbons can be used as a substitute for gasoline or as combustible gases.

As already stated, the sorbent can be regenerated. In the simplest case, one proceeds such that a heated regeneration gas, for instance heated air, is passed through the charge with the charged sorbent, the regeneration gas charged with the desorbate is cooled, with water and condensible organic compounds being separated, and the regeneration gas being subjected to a posttreatment to separate residual remaining organic compounds. The regeneration gas cleaned in this manner can then be discharged into the environment.

DESCRIPTION OF THE PREFERRED EMBODIMENTS

In a preferred embodiment, the regeneration gas is circulated in a closed circuit. This embodiment of the invention is further explained with reference to FIG. 1.

Figure 1:
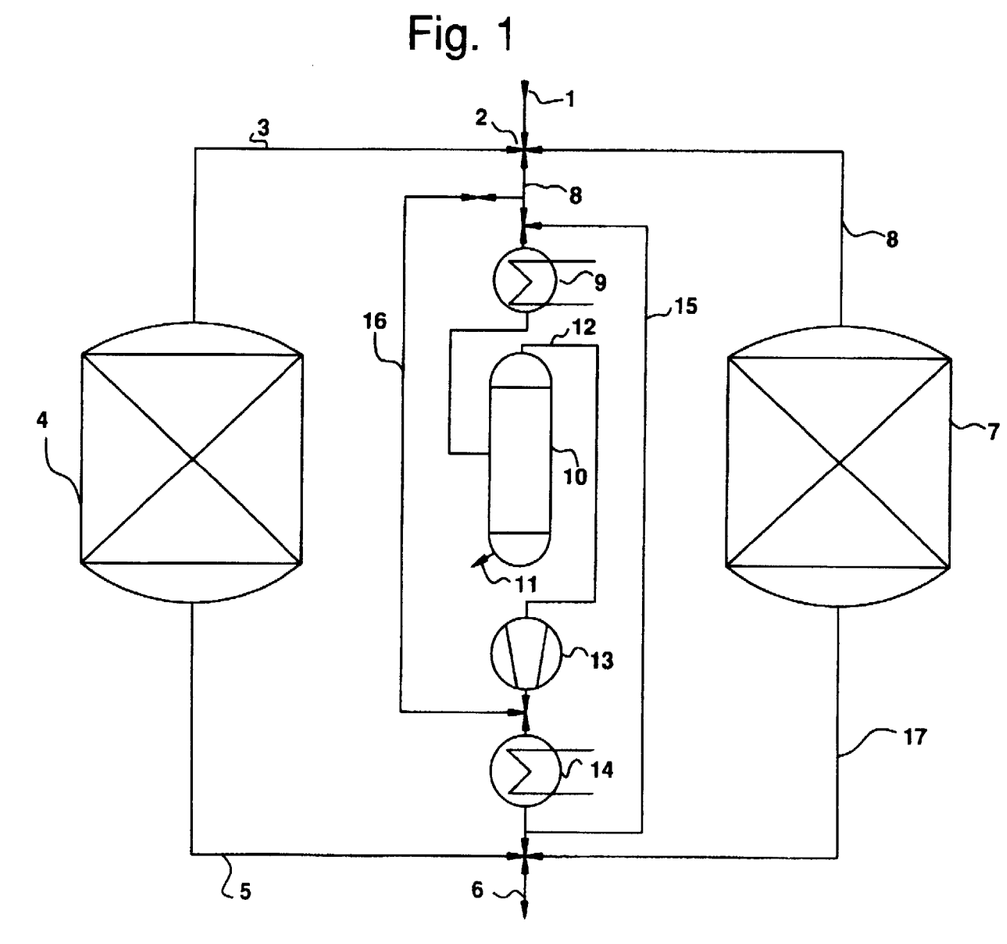
FIG. 1 is a flow diagram of a closed circuit, two absorber embodiment of the invention.

The gas to be treated is supplied via line 1. The gas is introduced via the multiway valve 2 and line 3 into the absorber 4 switched to sorption, which contains a charge of the sorbent containing activated carbon and amorphous $SiO_2$. The gases which have been cleaned by contact with the sorbent leave the absorber 4 via line 5 and can be discharged via line 6 into the environment. The charged absorber 7 is being regenerated in the meantime. To this end, a regeneration gas (for instance an inert gas such as nitrogen or a split stream of the gas which is to be treated or has been treated) is passed over line 16 into heat exchanger 14 and is heated there. The heated gas is passed via line 17 into absorber 7 and desorbs the water absorbed by the sorbent charge, as well as organic substances. The desorbate-charged gas leaves the absorber 7 via line 8, it is passed via the multiway valve 2 into the heat exchanger 9 and is cooled there; the cooled gas is then introduced into condenser 10. The condensate which is deposited there is discharged via line 11 from condenser 10. Water and organic components can be separated in a phase separator. The organic components, in case of a natural gas treatment, for instance, C5+ hydrocarbons, can be used as fuel or propellant additive. The remaining gas stream leaves the condenser 10 via line 12 and is passed via a pump 13 into heat exchanger 14, it is heated there and passed via line 17 again into the absorber 7 to be regenerated. When the absorber 4 has been charged and the absorber 7 has been regenerated, the multiway valve is switched over. The gas to be treated, which has flown from line 1, is now conducted via line 8 through the regenerated absorber 4 from which the cleaned gas is discharged via line 17 and line 6 into the environment. In the meantime, and by analogy with the regeneration of absorber 7, the absorber 4 is treated with regeneration gas which is introduced via line 5 into absorber 4. Hence, in this embodiment the regeneration gas is circulated. It is possible to proceed in such a manner that, if desired, the gas is only heated at the beginning of the regeneration in the heat exchanger 14.

In particular, when two alternately operated absorbers are used, the above-described regeneration is preferred with recirculation of the regeneration gas. Of course, it is also possible to guide a split stream of the gas which is to be treated or has been treated in the bypass either constantly or temporarily.

Especially when at least three alternately operated absorbers are used, it is especially advantageous to guide a split stream of the gas which is to be treated or has been treated either temporarily or constantly in the bypass past the absorber respectively used for sorption and to use it for the regeneration of the absorber to be respectively regenerated. One expediently proceeds such that one absorber is switched to sorption, one absorber is already regenerated and flown through and cooled by the regeneration gas, and another absorber is regenerated by heated regeneration gas. There are various expedient variants.

In this embodiment, there are at least three absorbers A, B and C, absorber A being switched to sorption, absorber B being already present in regenerated form and being in a state which is still hot from regeneration, and absorber C is to be regenerated; the gas to be treated is thus introduced through absorber A. In a variant I, a split stream of the gas to be treated is first passed through absorber B and the gas stream which leaves absorber B is being heated and passed through the absorber C to be regenerated, the gas stream leaving absorber C, which is enriched with desorbate, is cooled, condensing organic compounds (and condensing water) and the residual gas stream comprising the non-condensing components are passed through absorber A.

In a variant II, a split stream of the gas to be treated is first heated and passed through absorber C, the gas stream which leaves absorber C and is enriched with desorbate is cooled, condensing organic components (and condensing water) are separated, the gas stream comprising non-condensing components is passed through absorber B, the latter being thereby cooled, and the gas stream leaving absorber B is admixed to the gas to be treated for the purpose of passing it through absorber A.

In a third variant, a split stream of the gas to be treated is heated and passed through absorber C, the gas stream which leaves absorber C and is enriched with desorbate is cooled, condensing organic compounds (and condensing water) are separated and the residual gas stream is admixed to the gas to be treated for the purpose of passing it through absorber A. In this variant III, a split stream of the gas leaving absorber A is additionally passed through absorber B which is thereby cooled, and the gas stream leaving absorber B is admixed to the main stream of the treated gas.

Figure 2:
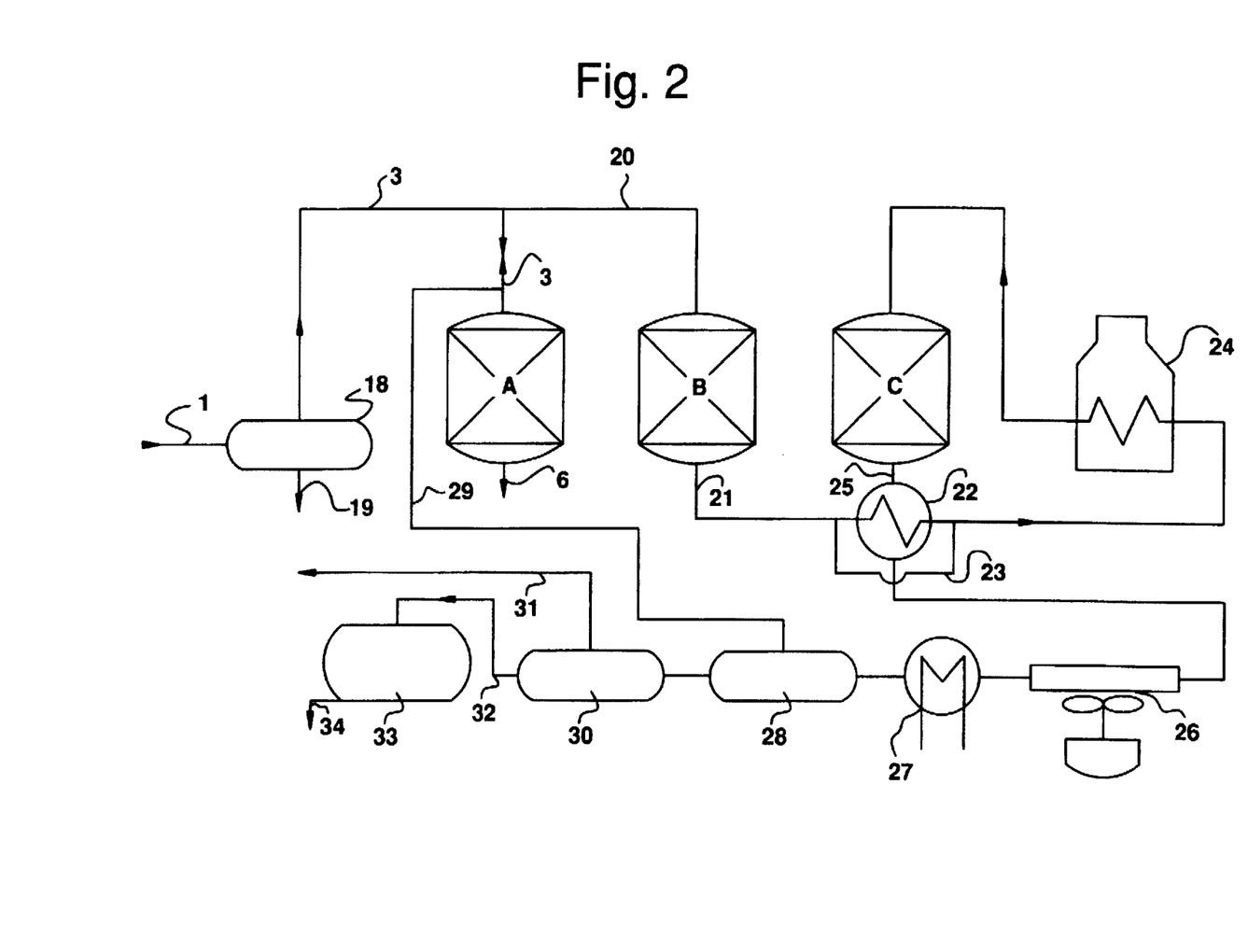
FIG. 2 is a flow diagram of a three absorber variant embodiment of the invention.

FIG. 2 illustrates variant I. The illustrated scheme comprises a few components (precondenser, air cooler, two-stage condenser) which are not imperative for carrying out the variant, but have turned out to be especially advantageous during technical use (the same applies to the variants II and III, which will be discussed later, and the associated FIGS. 3 and 4). The gas to be treated is passed via line 1 into precondenser 18. Condensing components can be removed via line 19. The residual gas stream is passed via line 3 into the absorber A switched to absorption, and the cleaned gas is discharged via line 6 into the environment or used technically. A split stream of the gas to be treated is taken from line 3 via line 20 and passed through the freshly regenerated, still heated absorber B, which is thereby cooled. The gas leaving absorber B in substantially unchanged form is introduced via line 21, if desired, through heat exchanger 22, or partly or fully via bypass 23 into a heater 24. The gases leaving the heater pass through the charge of the sorbent of the absorber C to be regenerated. The desorbate-charged gases leave absorber C via line 25, pass the heat exchanger 22 and are precooled in air cooler 26. They subsequently pass through cooler 27 and are then introduced into the high-pressure condenser 28. The small amount of highly pressurized non-condensing components in the desorbate-containing gas stream is admixed via line 29 into line 3 for the purpose of treatment in absorber A. The condensate of the high-pressure condenser 28 is introduced into the low-pressure condenser 30. Non-condensing components, such as low-boiling hydrocarbons, are discharged via line 31 and can be used as combustible gases. The condensate of condenser 30 is introduced via line 32 into supply tank 33. For instance, with natural gas, higher-boiling hydrocarbons are predominantly used, especially C6+ hydrocarbons, as well as water which can be separated by phase separation. The hydrocarbons, for instance, serve as propellant additives and can be removed via line 34 from the supply tank.

Figure 3:
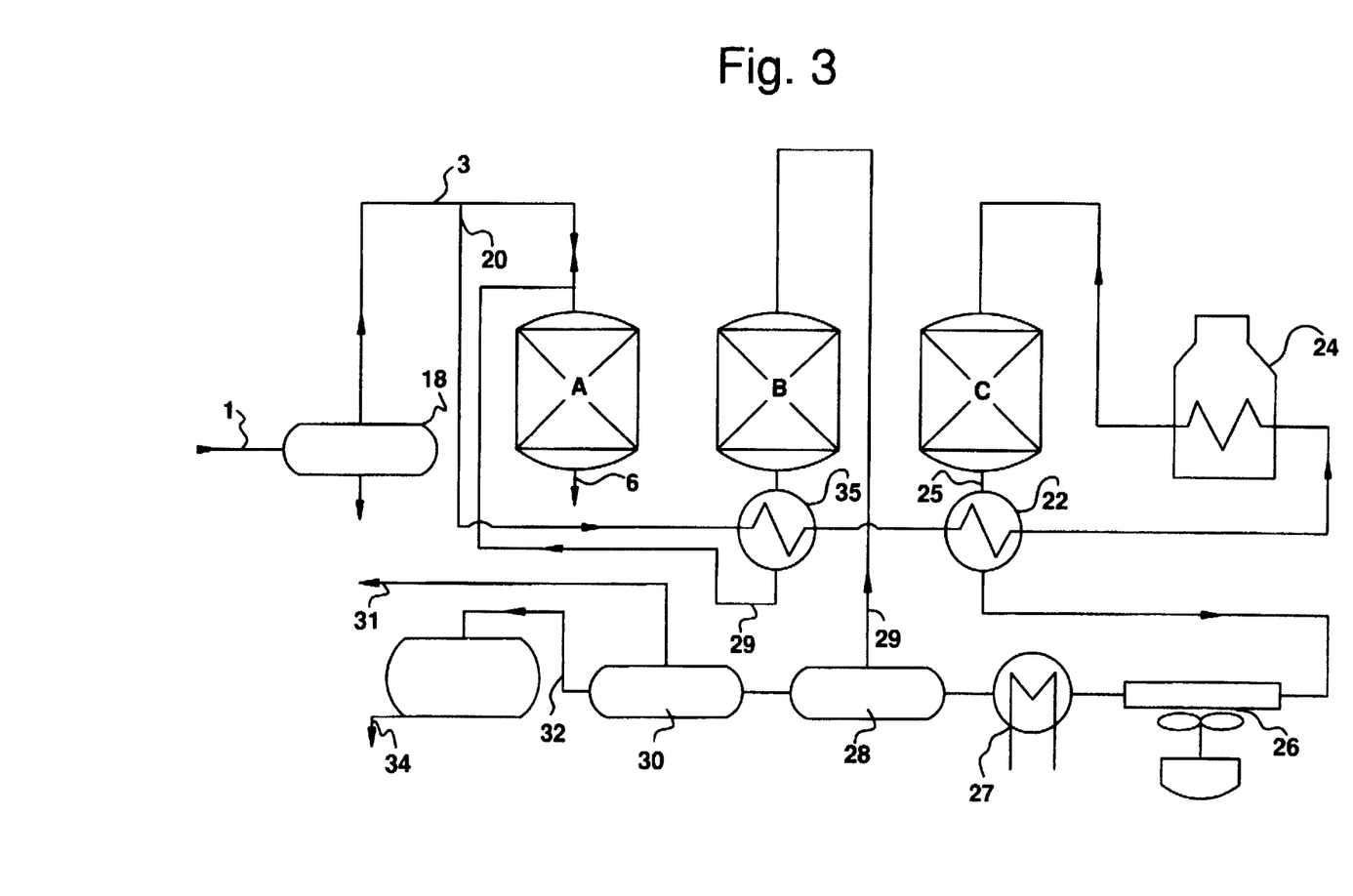
FIG. 3 is a flow diagram of another three absorber variant embodiment of the invention.

FIG. 3 illustrates variant II. Like in variant I, the gas to be treated is passed via line 1 into precondenser 18 and via line 3 through the absorber A which is switched to sorption. The cleaned gases leave the absorber via line 6. The cleaned gases leave the absorber via line 6. A split stream of the gas to be treated is passed via line 20 through the heat exchangers 35 and 22 into heater 24. The hot gases leaving heater 24 are passed through the absorber C to be regenerated. The desorbate-charged gases leave absorber C via line 25 and are introduced via air cooler 26 and cooler 27 into the high-pressure condenser 28. The non-condensing part of the gas is passed from the high-pressure condenser 28 via line 29 into the freshly regenerated, still heated absorber B. The substantially unchanged, slightly cooled gases are then admixed via heat exchanger 35 to the gas stream to be treated in line 3 for the purpose of treatment in absorber A. The condensate of the high-pressure condenser 28 is then further treated as described in variant I.

Figure 4:
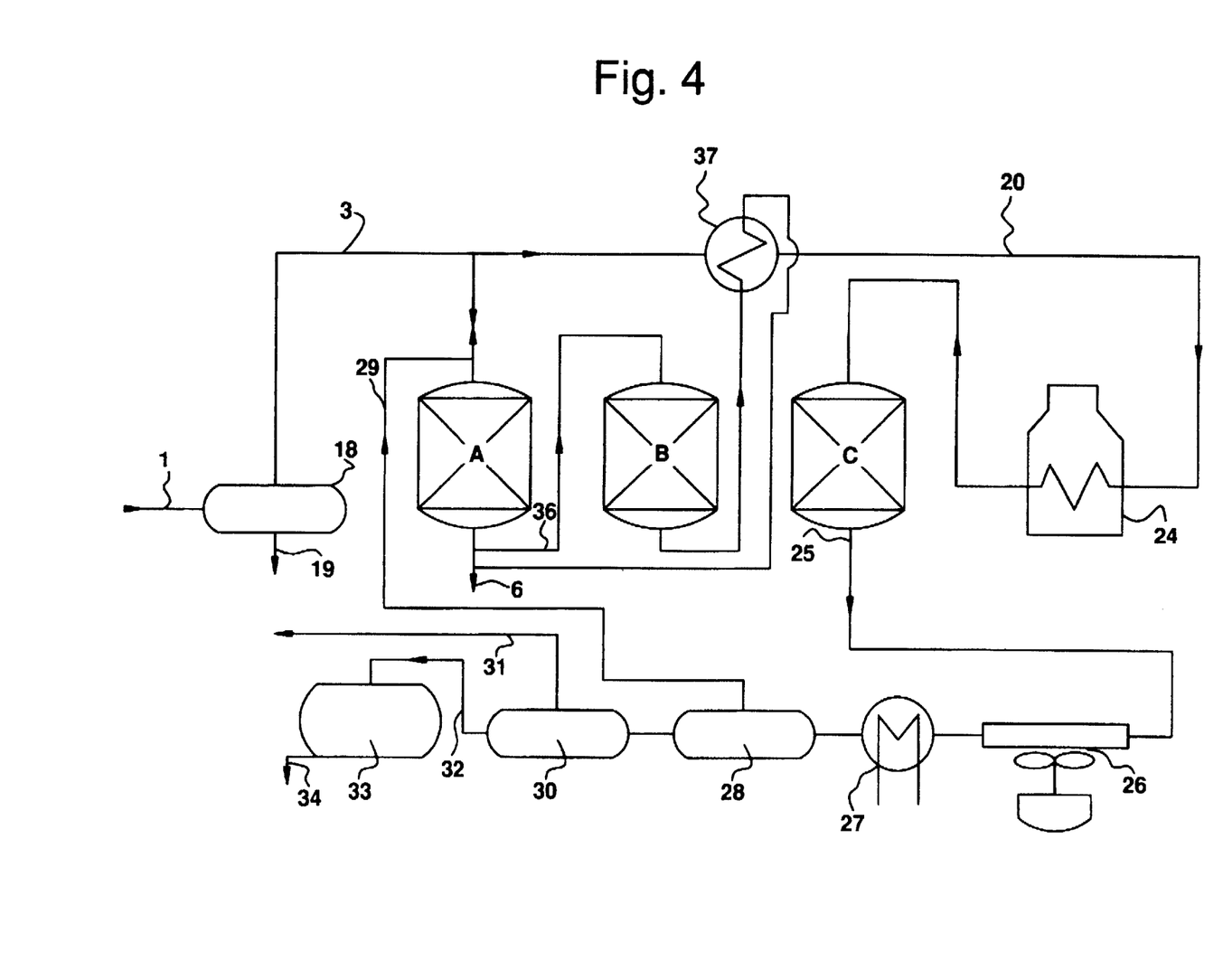
FIG. 4 is a flow diagram of another three absorber variant embodiment of the invention.

FIG. 4 illustrates variant III. In this case, too, the gas to be treated is passed via line 1 and precondenser 18 and via line 3 through the absorber A which has been switched to absorption, and the cleaned gases are discharged via line 6 into the environment. A split stream of the gas to be treated is taken from line 3 and passed via line 20 first of all into heater 24. The heated gases which leave heater 23 are passed through the absorber C to be regenerated. The desorbate-enriched gases leave the absorber C via line 25 and are again introduced through air cooler 26 and heat exchanger 27 first into the high-pressure condenser 28. The non-condensing components of the gas stream are added via line 29 to the gas to be treated. The condensate of condenser 28 is further treated as described in variant 1. In this variant, the freshly regenerated, still heated absorber B is cooled by a split stream of the gas to be treated, the split stream following from line 6 and being passed via line 36 through absorber B, whereby the latter is cooled. The already slightly cooled gas is passed over heat exchanger 37 and is then added again to the gas stream in line 6.

It is an advantage of the process of the invention that water and C5+ hydrocarbon compounds can be absorbed simultaneously and selectively or that water and $CO_2$ or C2+ hydrocarbon compounds can be absorbed simultaneously. It has even been found that the used activated carbon is especially well suited for sorption. For instance, five times the amount of pure activated carbon just exhibits an additional capacity of 50%. Systems can therefore be given a smaller size. Another advantage is the facilitated desorption and the strongly reduced flammability of the used activated carbon.

The following examples shall further explain the invention.

Examples 1 to 13 describe the production of the sorbent containing activated carbon; examples 14 to 15 the application for the simultaneous sorption of water and specific hydrocarbon compounds or $CO_2$.

EXAMPLES 1 TO 11

Production of activated carbon and, optionally, crystalline wide-pored $SiO_2$-containing sorbents based on amorphous $SiO_2$.

GENERAL PREPARATION RULE:

A sodium silicate solution containing 6.30% by wt. of $Na_2O$ and 21.16% by wt. of $SiO_2$ and having a density $d_{20}=1.256$ was used as a source for the amorphous $SiO_2$. Activated carbon or graphite and, optionally, wide-pored $SiO_2$ (finely divided particles, pore diameter 20 to 30 Å), were added to the sodium silicate solution in the form of an aqueous suspension (mash). Precipitation was carried out by mixing with an acid solution which was an aqueous sulfuric acid having a concentration of 7.87% by wt. of $H_2SO_4$ and a density of $d_{20}=1.049$. A pH value of 6.9 was obtained upon mixing the alkaline solution and the acid solution. The mixture was immediately introduced into a precipitation oil and the resultant beads, optionally following an ageing step, were washed until they had been freed from sulfate. A base exchange was then performed, the beads being contacted with 0.5% by wt. of $H_2SO_4$-containing sulfuric acid for five times 3 hours each. A recirculating drier was then used for drying at 180° C. with steam for 3.5 hours. Tempering was subsequently performed. Following ageing, drying was performed.

The process parameters and properties of the resultant sorbents are summarized in the following Table 1:

TABLE 1

| Example | Used Mash | Cont. of Mash [% by wt.] | Mean Part. Size [micron] (8) | Volume Ratio Mash:Water Glass | Ageing [h] | Temper. h; °C. | Vibrat. Weight [g/ml] | Pore volume [ml/g]] | Surface [m²/ml] | Bursting Pressure [kg] | Cont. of Act. Carbon [% by wt.] |
|---|---|---|---|---|---|---|---|---|---|---|---|
| 1 | Act. Carbon (1) | 13.8 | 4.7 | 0.438 | 2 | 18/200 | | 0.91 | 817 | 2.7 | 20 |
| 2 | Graphite SiO₂ wide-pored | 21.4 21.4 | 8.6 4.2 | 0.375 | 2 | 18/200 | 0.53 | 0.63 | 680 | | 3 |
| 3 | Graphite SiO₂ wide-pored | 21.4 21.4 | 8.6 1.8 | 0.375 | 2 | 18/200 | 0.59 | | | | 11.3 |
| 4 | Act. Carbon (2) | 16.1 | 4.8 | 0.411 | 18 | 18/200 | 0.40 | 1.01 | 675 | 1.4 | 6.4 |
| 5 | Act. Carbon (2) | 21.4 | 5.2 | 0.411 | 18 | 4/180 + 18/200 | 0.41 | 1.07 | 285 | 7.2 | 6.4 |
| 6 | Act. Carbon (3) | 15.3 | 2.8 | 0.395 | 4 | 6/200 | | 0.79 | 758 | 3.7 | 20 |
| 7 | Act. Carbon (3) | 13.0 | 2.8 | 0.464 | 4 | 6/200 | 0.49 | 0.73 | 739 | 2.9 | 20 |
| 8 | Act. Carbon (4) (11) | 15.5 | 2.6 | 0.390 | 4 | 6/200 | 0.43 | 0.90 | 745 | 0.9 | 20 |
| 9 | Act. Carbon (5) (12) | 10.8 | 2.8 | 0.562 | 4 | 6/200 | 0.48 | 0.76 | 719 | 3.2 | 20 |
| 10 | Act. Carbon (6) | 14.3 | 0.9 | 0.423 | 4 | 6/200 | | 0.95 | 592 | | 20 |
| 11 | Act. Carbon (7) (13) | 12.1 | 1.4 | 0.500 | 4 | 6/200 | 0.52 | 0.68 | 722 | 6.9 | 20 |
| 12 | Graphite | 21.4 | 8.6 | (9) | — | 18/200 | 0.48 | | | | 8.0 |
| 13 | Graphite | 21.4 | 8.6 | (10) | — | 18/200 | 0.47 | | | | 4.2 |

Explanations regarding Table 1:
(1) product Lurgi AS 4/420 ®
(2) A-Kohle Riedel 18003 ®
(3) Norit P1 ®, American Norit Co.
(4) Lurgi Carbopol SC 44/1 ®
(5) Lurgi Gn-A ®
(6) Degussa FlammruB ®
(7) Norit SA 1 ®
(8) $d_{50}$ determined according to the Cilas method
(9) finished SiO₂ beads, sprayed
(10) finished SiO₂ beads, sprayed
(11) bulk density: 0.40 g/ml
(12) bulk density: 0.45 g/ml
(13) bulk density: 0.48 g/ml formed in Example 5 and the dried beaded bodies were subjected to a base exchange by contacting the same with sulfuric acid of a concentration of 0.5% by wt. of H₂SO₄ five times for 3 hours, and were then washed until freed from fate. Instead of sulfuric acid, 0.5% by wt. of Al₂(SO₄)₃ solution was used in Example 1.

EXAMPLES 12 AND 13

Beaded amorphous SiO₂ was used in the form of the commercial product "AF25ᴿ" of Solvay Catalysts GmbH. These are beads having a diameter of from 2 to 6 mm. These beads were sprayed with an aqueous graphite suspension and then dried at 200° C. for 18 hours.

EXAMPLE 14

Simultaneous separation of water and carbon dioxide or C5+ hydrocarbons.

Natural gas normally contains about 93.5 to 94% by mole of methane. The content of carbon dioxide typically varies between 0.3 and 0.4% by mole, the content of ethane is normally 2.6 to 3% by mole, C5+ hydrocarbons are present in an amount of 0.3 to 0.8% by mole. Of course, these are only approximate values which can vary in natural gas.

EXAMPLE 14.1

Separation of carbon dioxide, ethane and water.

Use was made of a sorbent comprising 20% by wt. of activated carbon in amorphous SiO₂ in the form of beads having an average bead diameter of 3.5 mm (commercial product AK 20 of Solvay Catalysts GmbH, Hannover, Germany). These beads have an equilibrium adsorption capacity of 4.8% by wt. for water vapor at 25°, with gases exhibiting 10% relative humidity. In gases having 40% relative humidity, the equilibrium adsorption capacity is 18.3% by wt. and even 55.1% by wt. in gases with 80% relative humidity. The surface is 800 m$_2$/g, the pore volume 0.6 cm$^3$/g, the average pore diameter is 3 mm and the adsorption capacity for n-pentane is 38% by wt. at the saturation point.

Natural gas was passed through a charge of 1 l of the above-described beads at a pressure of 1 bar and a temperature of 20° C. The duration was about 5 minutes. An analysis of the charged beads revealed that the capacity for ethane was between 6 and 7 l per liter of sorbent. The $CO_2$ capacity was about 3 to 3.5 l of $CO_2$ per liter of sorbent. The water was fully separated from the natural gas. The sorbent was regenerated according to the changing pressure principle, i.e. the beads as charged (at about a partial pressure of about 0.32 bar for $CO_2$ and 0.66 bar for ethane) were flown through at a much smaller pressure, namely at almost 0 bar, by an inert gas which was being enriched with the desorbing ethane and carbon dioxide. The absorbing water was then removed at a temperature of 20° C.

EXAMPLE 14.2

Separation of water and higher-boiling hydrocarbons from natural gas.

In this example, the suitability of sorbents comprising activated carbon in amorphous $SiO_2$ for the separation of higher hydrocarbons and water from natural gas was tested. A gas which, apart from natural gas and water, contained benzene as a main substance was selected as test gas. Suitability was tested at various pressures with respect to the equilibrium capacity in weight percent. The results are summarized in the following Table 1:

| Temperature | Steam Pressure | Equilibrium Capacity (%) |
|---|---|---|
| 29° C. | 2 | 7 |
|  | 40 | 17 |
|  | 80 | 19 |
|  | 600 | 31 |
|  | 900 | 33 |
| 44° C. | 20 | 7 |
|  | 100 | 16 |
|  | 200 | 18 |
|  | 1000 | 31 |
|  | 2000 | 33 |

These values are in part considerably above values of otherwise similar sorbents without any content of activated carbon.

The hydrocarbon n-nonane is also a test substance on the basis of which the suitability of sorbents for treating natural gas can be checked. The following Table 2 shows values for the adsorption of n-nonane at different pressures and temperatures:

| Temperature | Steam Pressure (Pascal) | Equilibrium Capacity (%) |
|---|---|---|
| 36° C. | 0.25 | 6.7 |
|  | 3.41 | 10 |

| Temperature | Steam Pressure (Pascal) | Equilibrium Capacity (%) |
|---|---|---|
|  | 41.6 | 13.7 |
|  | 121 | 16 |
|  | 465 | 18.7 |
| 67° C. | 2.44 | 6.7 |
|  | 24 | 10 |
|  | 299 | 13.7 |
|  | 733 | 16 |
|  | 2295 | 18.7 |

A high equilibrium capacity which is above average is here also present. Hence, the sorbents are excellently suited for treating natural gas with a view to separating higher-boiling hydrocarbons and water.

EXAMPLE 15

Cleaning of waste gases of the phthalic acid anhydride synthesis.

Waste gases of the phthalic acid anhydride synthesis normally contain small amounts of para-xylene, methyl acetate, methyl bromide, acetic acid, large amounts of water, oxygen and carbon dioxide, and very large amounts of nitrogen. Such a waste gas was passed over a charge of a sorbent comprising 20% by weight of activated carbon in $SiO_2$ (product AK 20 of Solvay Catalysts GmbH). The amount of sorbent was designed such that about 6 kg of sorbent were used per liter of sorbate. The pressure was about 16 to 20 bar, the temperature about 47° C., the separating period 0.35 hours. The gas leaving the adsorber only contained 50 ppm p-xylene, methyl acetate and acetic acid, and 350 ppm $H_2O$.

We claim:

1. A process for the simultaneous sorption of water and organic compounds from process gases of maleic acid anhydride synthesis, terephthalic acid anhydride synthesis or phthalic acid anhydride synthesis, wherein the gas is contacted with a sorbent comprising particulate activated carbon in an oxidic carrier, wherein said carrier has been made from a gel.

2. A process according to claim 1, wherein the activated carbon is present in the form of particles having a size of from 50 to 10,000 nm.

3. A process according to claim 1 or 2, wherein the activated carbon is contained in the sorbent in an amount of from 0.5 to 70% by weight based on the total weight of said sorbent.

4. A process according to claim 1, wherein the carrier consists of amorphous silicon dioxide and is beaded.

5. A process according to claim 1, wherein, for simultaneously separating water and C5+ hydrocarbons, the sorbent and the gas to be treated or the sorbent and the gas stream to be treated are contacted for a period of at least 20 minutes.

6. A process according to claim 5, wherein the treatment is carried out at a pressure of from 1 to 150 bar (abs.).

7. A process according to claim 1, wherein the gas treated is natural gas and that the treatment is carried out at a pressure of at least 30 bar.

8. A process according to one of the claims 5 to 7, wherein sorption is carried out at a temperature of from 0° to 50° C. and that regeneration is carried out at a temperature of from 100° to 350° C.

9. A process according to claim 8, wherein regeneration is carried out by passing through a regeneration gas heated to a temperature of from 150° to 300° C., the regeneration gas being a split stream of the gas to be treated, said split stream being charged with the desorbate during regeneration, the regeneration gas charged with the desorbate being cooled and freed from said desorbate by condensation, whereupon the regeneration gas, which no longer contains any desorbate, is admixed to the gas to be treated or the gas which has been treated.

10. A process according to claim 8, wherein the regeneration gas is circulated in a closed circuit.

11. A process according to claim 8, wherein the regeneration gas is guided in a bypass.

12. A process according to claim 8, wherein at least three absorbers A, B and C are provided, absorber A being in the absorption cycle, absorber B being in the condition in which it has been heated prior to the regeneration process, absorber C being in the condition in which it is to be regenerated, and the gas to be treated being passed through absorber A, wherein a) a split stream of the gas to be treated is first passed through absorber B and the gas stream discharged from absorber B is heated and passed through the absorber C to be regenerated, whereupon the gas stream which is discharged from absorber C and which is enriched with desorbate is cooled, condensing organic compounds are separated, and the residual gas stream containing non-condensing constituents is passed through absorber A, or b) a split stream of the gas to be treated is first heated and passed through absorber C, whereupon the gas stream which is discharged from absorber C and which is enriched with desorbate is cooled, condensing organic constituents are separated, the gas stream containing non-condensing constituents is passed through absorber B, and the gas stream discharged from absorber B is admixed to the gas to be treated for passing it then through absorber A, or c) a split stream of the gas to be treated is heated and passed through absorber C, whereupon the gas stream which is discharged from absorber C and which is enriched with desorbate is cooled, condensing organic compounds are separated and the residual gas stream is admixed to the gas to be treated for passing it then through absorber A, and a split stream of the gas discharged from adsorber A is passed through adsorber B, whereupon the gas stream discharged from absorber B is admixed to the main stream of the gas to be treated.

13. A process according to claim 1, wherein, for simultaneously separating water and C2+ hydrocarbons, the sorbent and the gas or the sorbent and the gas stream to be treated are contacted for a period which does not exceed 15 minutes.

14. A process according to claim 13, wherein waste gases of a steam reforming process are treated.

15. A process according to one of claims 13 to 14, wherein sorption is carried out at a temperature of from 0° to 50° C., and that desorption is carried out at a temperature of from 0° to 50° C.

16. A process according to claim 15, wherein sorption is carried out at a pressure of from 1 to 100 bar (abs.), and that desorption is carried out at a pressure of from 0.1 to 10 bar (abs.).

* * * * *